United States Patent
Kuhnen et al.

(10) Patent No.: US 11,680,842 B2
(45) Date of Patent: Jun. 20, 2023

(54) VIBRONIC SENSOR WITH TEMPERATURE COMPENSATION

(71) Applicant: Endress+Hauser SE+Co. KG, Maulburg (DE)

(72) Inventors: Raphael Kuhnen, Schliengen (DE); Izabella Sandor, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 33 days.

(21) Appl. No.: 17/293,994

(22) PCT Filed: Oct. 31, 2019

(86) PCT No.: PCT/EP2019/079872
§ 371 (c)(1),
(2) Date: May 14, 2021

(87) PCT Pub. No.: WO2020/099141
PCT Pub. Date: May 22, 2020

(65) Prior Publication Data
US 2022/0003591 A1  Jan. 6, 2022

(30) Foreign Application Priority Data
Nov. 15, 2018 (DE) ............. 10 2018 128 734.8

(51) Int. Cl.
G01F 23/296 (2022.01)

(52) U.S. Cl.
CPC ................ G01F 23/2967 (2013.01)

(58) Field of Classification Search
CPC ...... G01F 23/2967; G01N 9/00; G01N 9/002; G01N 2009/006
See application file for complete search history.

(56) References Cited

U.S. PATENT DOCUMENTS 10,429,286 B2 * 10/2019 Brengartner ......... G01N 29/036
10,928,240 B2 *  2/2021 Monse ................. G01N 11/16
(Continued)

FOREIGN PATENT DOCUMENTS

DE       3618798 A1    12/1987
DE      10050299 A1     4/2002
(Continued)

*Primary Examiner* — John Fitzgerald
(74) *Attorney, Agent, or Firm* — Christopher R. Powers; Endress+Hauser (USA) Holding, Inc.

(57) ABSTRACT

A method for determining and/or monitoring a process variable of a medium using a vibronic sensor includes: exciting a mechanically vibratable unit to vibrate in a first vibration mode via a drive/receiving unit using a first excitation signal; receiving and converting the vibrations of the first vibration mode into a first reception signal; generating the first excitation signal based on the first reception signal; determining the process variable from the first reception signal; exciting the vibratable unit to vibrate in a second vibration mode via the drive/receiving unit via a second excitation signal; receiving and converting the vibrations the second vibration mode into a second reception signal, where the second excitation signal is generated based on the second reception signal; and compensating for an influence of a temperature of the medium on the first reception signal using the second reception signal.

14 Claims, 4 Drawing Sheets

(56) References Cited

U.S. PATENT DOCUMENTS

| | | | | |
|---|---|---|---|---|
| 11,360,012 B2* | 6/2022 | Mack | ................ | G01N 9/002 |
| 11,454,531 B2* | 9/2022 | Brengartner | ......... | G01N 29/022 |
| 2019/0368914 A1* | 12/2019 | Brengartner | ......... | G01N 29/022 |
| 2020/0041326 A1* | 2/2020 | Monse | ................ | G01N 11/16 |
| 2020/0340896 A1* | 10/2020 | Mack | ................ | G01N 9/002 |
| 2022/0196456 A1* | 6/2022 | Girardey | ............ | G01F 23/296 |

FOREIGN PATENT DOCUMENTS

| | | |
|---|---|---|
| DE | 10057974 A1 | 5/2002 |
| DE | 102005029490 A1 | 1/2006 |
| DE | 102005015547 A1 | 10/2006 |
| DE | 102006007199 A1 | 8/2007 |
| DE | 102006033819 A1 | 1/2008 |
| DE | 102006034105 A1 | 1/2008 |
| DE | 102007013557 A1 | 2/2008 |
| DE | 102007043811 A1 | 3/2009 |
| DE | 102009026685 A1 | 12/2010 |
| DE | 102009028022 A1 | 2/2011 |
| DE | 102010030982 A1 | 1/2012 |
| DE | 102015102834 A1 | 9/2016 |
| DE | 102015104533 A1 | 9/2016 |
| DE | 102016112308 A1 | 1/2018 |
| DE | 102016112743 A1 | 1/2018 |
| DE | 102016117194 A1 | 3/2018 |
| DE | 102016124740 A1 | 6/2018 |
| JP | 2000028550 A | 1/2000 |
| JP | 2004251823 A | 9/2004 |
| WO | 0242724 A1 | 5/2002 |
| WO | 2007113011 A1 | 10/2007 |
| WO | 2007114950 A2 | 10/2007 |
| WO | 20130974990 A1 | 7/2013 |
| WO | WO 2016/150621 * | 2/2016 |
| WO | 2018050595 A | 3/2018 |

* cited by examiner

PRIOR ART

PRIOR ART

VIBRONIC SENSOR WITH TEMPERATURE COMPENSATION

CROSS-REFERENCE TO RELATED APPLICATIONS

The present application is related to and claims the priority benefit of German Patent Application No. 10 2018 128 734.8, filed on Nov. 15, 2018, and International Patent Application No. PCT/EP2019/079872, filed on Oct. 31, 2019, the entire contents of which are incorporated herein by reference.

TECHNICAL FIELD

The invention relates to a method for determining and/or monitoring at least one process variable of a medium by means of a vibronic sensor and to a corresponding device or a corresponding vibronic sensor. The device comprises a mechanically vibratable unit, a drive/receiving unit, and an electronic unit. The process variable is given, for example, by the fill level, in particular a limit level, or the flow rate of the medium or also by its density or viscosity. The medium is located, for example, in a receptacle, e.g. a container, a tank, or also in a pipeline. The medium itself is, for example, given by a liquid, a gas or a bulk material.

BACKGROUND

Vibronic sensors are often used in process and/or automation technology. In the case of fill-level measuring devices, they have at least one mechanically oscillatable unit, such as a tuning fork, a single rod, or a membrane. During operation, the latter is excited to vibrate mechanically by a drive/receiving unit, often in the form of an electromechanical transducer unit that may, in turn, be a piezoelectric drive or an electromagnetic drive, for example. A wide variety of corresponding field devices are made by the applicant and are distributed under the name LIQUIPHANT or SOLIPHANT. The underlying measurement principles are known in principle from numerous publications. The driving/receiving unit excites the mechanically oscillatable unit to mechanical oscillations by means of an electrical excitation signal. Conversely, the driving/receiving unit can receive the mechanical oscillations of the mechanically oscillatable unit and convert them into an electrical receive signal. The driving/receiving unit is accordingly either a separate driving unit and a separate receiving unit, or a combination driving/receiving unit.

The drive/receiving unit is in many cases part of a feedback electrical vibration circuit by which the excitation of the mechanical vibrating unit to vibrate mechanically is accomplished. For example, the vibrating circuit condition according to which the amplification factor is and all phases occurring in the vibrating circuit result in a multiple of 360° must be satisfied for a resonant vibration. For the excitation and fulfillment of the vibrating circuit condition, a certain phase shift between the excitation signal and the reception signal must be ensured. A specifiable value for the phase shift is frequently set, i.e., a target value for the phase shift between the excitation signal and the reception signal. Various solutions, both analog and digital methods, have become known from the prior art, as described, for example, in documents DE 102006034105A1, DE 102007013557A1, DE 102005015547A1, DE 102009026685A1, DE 102009028022A1, DE 102010030982A1 or DE 102010030982A1.

Both the excitation signal and the reception signal are characterized by their frequency ω, amplitude A and/or phase φ. Accordingly, changes in these conditions are usually used to determine the respective process variables. The process variable can be, for example, a fill level, a predetermined fill level, or also the density or the viscosity of the medium, and also the flow rate. In the case of a vibronic limit level switch for liquids, for example, a distinction is made between whether the vibrating unit is covered by the liquid or vibrates freely. These two states, the free state and the covered state, are thus differentiated—for example, based on different resonant frequencies, i.e., based on a frequency shift.

The density and/or viscosity, in turn, can only be determined with such a measuring instrument if the vibrating unit is covered by the medium. In connection with the determination of the density and/or viscosity, different possibilities from the prior art have likewise become known, such as, for example, those disclosed in documents DE 10050299A1, DE 102007043811A1, DE10057974A1, DE 102006033819A1, DE 102015102834A1 or DE 102016112743A1.

Piezoelectric and/or electromagnetic drive/receiving units are used in particular for the drive/receiving unit itself. In the case of drive/receiving units based on the piezoelectric effect, a comparatively high efficiency can generally be achieved. However, they are only conditionally suitable for use at high temperatures, in particular at temperatures above 300° C. An alternative is given in this connection by electromagnetic drive/receiving units, as described, for example, in the documents WO 2007/113011, WO 2007/114950 A1, DE 102015104533A1, DE 102016112308A1. The conversion of electrical energy into mechanical energy takes place here in each case via a magnetic field. The described transducer units therefore each comprise at least one coil and one permanent magnet. A magnetic alternating field passing through the magnet is generated by means of the coil and a periodic force is transmitted to the vibratable unit via the magnet.

In principle, when operating a vibronic sensor, the respective prevailing process conditions, such as the temperature of the medium or the pressure in the respective receptacle, may have a decisive influence on the determination of the respective process variable. For example, the frequency of the reception signal obtained by the vibratable unit is dependent on the temperature. In order to compensate for this influence, it has become known from DE 102006007199A1 or DE 102005029490A1 to provide a vibronic measuring device with an additional temperature sensor. However, the integration of a further sensor in a measuring device is, in principle, associated with a certain design cost. A suitable placement and dimensioning must be ensured. Electrical contacts must be integrated and the electronics unit must be designed accordingly.

SUMMARY

Thus, the present invention is based on the object of providing a possibility with which a high measuring accuracy of a vibronic measuring device can be achieved independently of prevailing process conditions.

This object is achieved by the method according to claim 1 and by the device according to claim 9.

Relative to the method, the object of the present invention is achieved by a method for determining and/or monitoring at least one process variable of a medium by means of a vibronic sensor, wherein a mechanically vibratable unit is excited to vibrate mechanically in a first vibration mode via a drive/receiving unit by means of a first electrical excitation signal, the mechanical vibrations of the vibratable unit in the first vibration mode are received and are converted into a first electrical reception signal, and the first excitation signal is generated on the basis of the first reception signal, and the at least one process variable is determined from the first reception signal.

According to the invention, the mechanically vibratable unit is also excited to vibrate mechanically in a second vibration mode of the mechanically vibratable unit via the drive/receiving unit by means of a second electrical excitation signal, the mechanical vibrations of the vibratable unit in the second vibration mode are received and are converted into a second electrical reception signal, and the second excitation signal is generated on the basis of the second reception signal, and an influence of the temperature of the medium on the first reception signal is compensated for using the second reception signal.

Advantageously, the present invention does not require any additional sensor, in particular a temperature sensor, in the measuring device. Rather, the process variable is determined on the basis of a first vibration mode of the vibratable unit present in any case and the influence of the temperature is compensated for using a second vibration mode.

In one embodiment of the method, the first and second excitation signals are generated simultaneously, such that the mechanical vibrations of the vibratable unit in the first and second vibration modes are superimposed on one another.

Alternatively, however, it is likewise conceivable for the first and the second excitation signal to be generated alternately, in particular sequentially.

On the one hand, it is conceivable that the influence of the temperature on the first reception signal is directly compensated for on the basis of the second reception signal, without determining a value for the temperature itself. However, an embodiment of the method according to the invention also includes determining the temperature of the medium on the basis of the second reception signal. In this case, the temperature of the medium can be determined by means of the vibronic sensor in addition to information about the particular process variable to be determined.

In a particularly preferred embodiment of the method, a frequency of the second reception signal is determined and the influence of the temperature is determined on the basis of a change in the frequency of the second reception signal. The influence of the temperature on the second reception signal is thus determined and in a second step the influence of the temperature on the first reception signal, the frequency of which can likewise be determined, is compensated for.

A further preferred embodiment includes a reference curve and/or a reference value for the second reception signal and/or a variable derived therefrom being used to compensate for the influence of the temperature. This can be, for example, a reference curve and/or a reference value at a predetermined temperature. Again, for example, the frequency of the second reception signal can be used as a reference value.

It is also advantageous if, on the basis of the reference curve and/or the reference value for the second reception signal and/or the information derived therefrom, an influence of the density and/or the viscosity of the medium on the second reception signal is compensated for before the second reception signal is used to compensate for the influence of the temperature. In this way, it can be ensured that the medium has no or negligible influence on the second reception signal.

In a particularly preferred embodiment, the second excitation signal and therewith the second vibration mode is selected such that the frequency of the second reception signal is essentially constant as a function of the density and/or viscosity of the medium. The second vibration mode is thus selected such that it is essentially unaffected by the properties of the medium.

In contrast, the first excitation signal and therewith the first vibration mode are preferably selected such that the frequency depends on the physical and/or chemical properties of the medium, in particular in such a way that it is a function, in particular a monotonic function, of the density and/or viscosity of the medium.

With regard to the device, the object underlying the invention is achieved by a device for determining at least one process variable of a medium, comprising a mechanically vibratable unit, a drive/receiving unit and an electronic unit. The drive/receiving unit is designed to excite the mechanically vibratable unit by means of a first excitation signal to vibrate mechanically in a first vibration mode and to receive the mechanical vibrations of the vibratable unit in the first vibration mode and convert it into a first electrical reception signal. The electronics unit is further designed to generate the first excitation signal from the first reception signal, and to determine the at least one process variable from the first reception signal.

According to the invention, the drive/reception unit is further designed to excite the mechanically vibratable unit by means of a second excitation signal to vibrate mechanically in a second vibration mode and to receive the mechanical vibrations of the vibratable unit in the second vibration mode and convert it into a second electrical received signal. The electronics unit is in turn further designed to generate the second excitation signal from the second reception signal and to compensate for an influence of the temperature of the medium on the first reception signal on the basis of the second reception signal.

In one embodiment of the device, the vibratable unit is a membrane, a single rod or a vibration fork.

A further embodiment of the device includes the process variable being a fill level, in particular a predeterminable fill level, the density or the viscosity of the medium.

Within the framework of the present invention, a wide variety of embodiments of a vibronic sensor, in particular different drive/receiving units, can be used. In the following, two particularly preferred embodiments for a drive/receiving unit are specified without restricting generality.

In one embodiment, the drive/receiving unit comprises at least:
  a diaphragm displaceable into mechanical vibrations;
  two rods fastened to the membrane perpendicular to a base surface of the membrane;
  a housing, wherein the membrane forms at least a partial region of a wall of the housing, and wherein the two rods extend into the interior of the housing;
  two magnets, wherein one magnet each is fastened in the end region of one of the two rods facing away from the membrane; and
  a coil having a core mounted within the housing above the magnets, and which coil is energizable with an alternating current electrical signal,
  wherein the coil is designed to generate a magnetic field, which magnetic field sets the two rods into mechanical vibrations by means of the two magnets, and wherein the two rods are fastened to the membrane in such a way that vibrations of the membrane result from the vibrations of the two rods.

In a further embodiment, the drive/receiving unit comprises at least:

a diaphragm displaceable into mechanical vibrations;
at least three rods fastened to the membrane perpendicular to a base surface of the membrane;
a housing, wherein the membrane forms at least a partial region of a wall of the housing, and wherein the rods extend into the interior of the housing;
at least three magnets, wherein one magnet each is fastened in the end region facing away from the membrane to each of the at least three rods; and
a coil having a core mounted within the housing above the magnets, and which coil is energizable with an alternating current electrical signal,
wherein the coil is designed to generate a magnetic field, which magnetic field causes the rods to vibrate by means of the magnets,
wherein the rods are fastened to the membrane in such a way that vibrations of the membrane result from the vibrations of the rods,
wherein at least one of the rods is attached to the diaphragm essentially at a location along the base surface of the membrane,
at which location the second derivation of the deflection of the diaphragm from a rest position, as a function of the location on the base surface, is essentially zero.

Furthermore, a drive/reception unit according to one of the two embodiments with four rods described by way of example is particularly preferred.

The embodiments described in connection with the method according to the invention can also be applied mutatis mutandis to the device according to the invention and vice-versa.

BRIEF DESCRIPTION OF THE DRAWINGS

The invention and its advantageous embodiments are explained in more detail below with reference to FIG. 1-FIG. 3. The following is shown:

FIGS. 3a and 3b show the symmetrical (a) and the antisymmetrical (b) vibration mode of the first and second coupled resonators of the coupled vibration system from FIG. 2a;

DETAILED DESCRIPTION

Figure 1A:
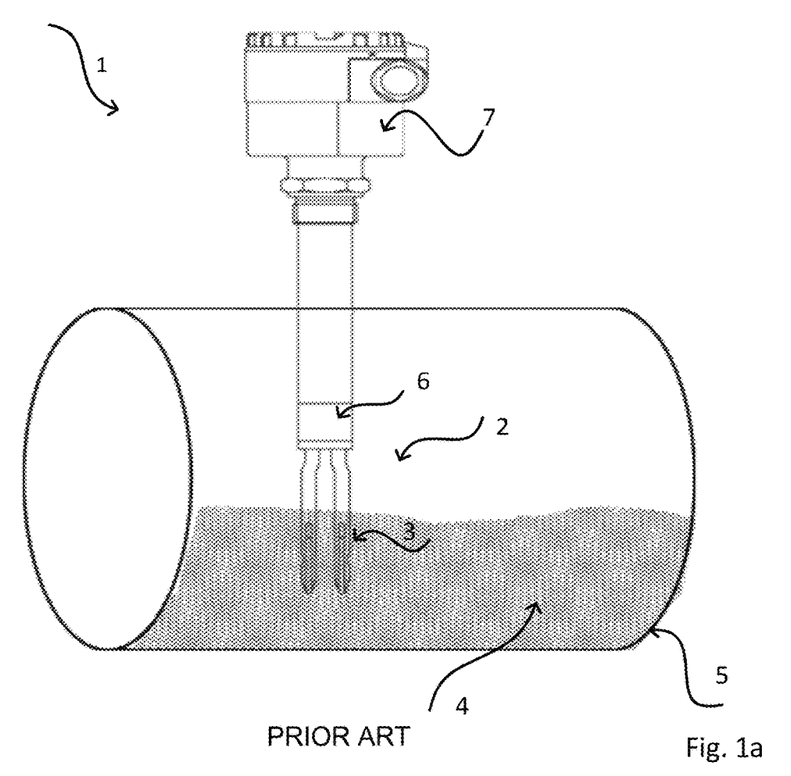
FIGS. 1a and 1b show a vibronic sensor according to the prior art.

FIG. 1a shows a vibronic fill level measuring device 1. A sensor unit 2 having a mechanically vibratable unit 3 is depicted in the form of a vibrating fork that is partially immersed into a medium 4, which is located in a container 5. The vibratable unit 3 is excited to mechanical vibrations to vibrate mechanically by means of the drive/receiving unit 6, as a rule an electromechanical transducer unit, and can be, for example, a piezoelectric stack or bimorph drive, but also an electromagnetic or also magnetostrictive drive/receiving unit. However, it is naturally understood that other embodiments of a vibronic sensor are also possible. In addition, an electronics unit 7 is illustrated, by means of which the signal reception, evaluation and/or storage is accomplished.

Figure 1B:
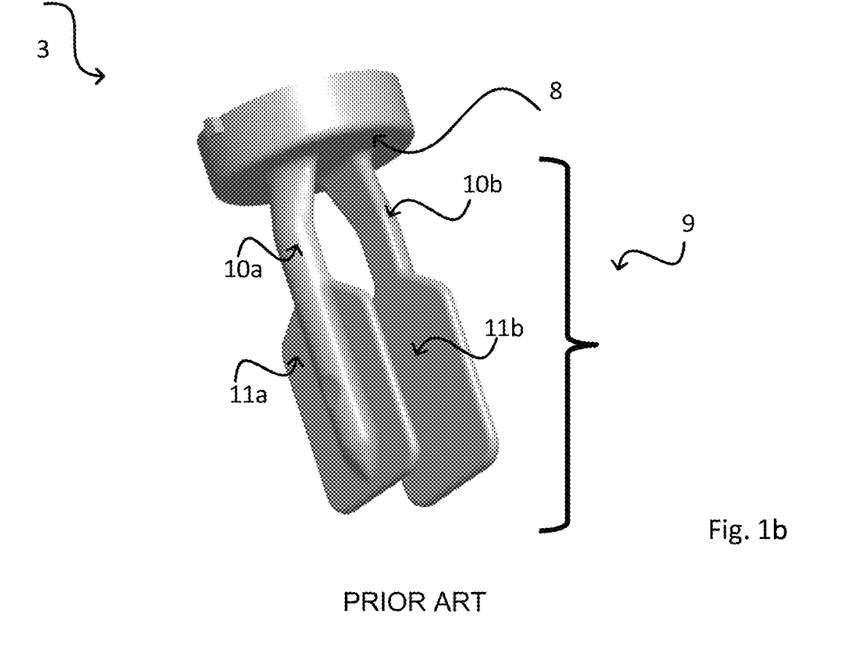

FIG. 1b once again shows a more detailed view of an vibratable unit 3 in the form of an vibrating fork, as is used, for example, for the vibronic sensor sold by the applicant under the name LIQUIPHANT. A membrane 8 and a vibrating element 9 connected thereto can be seen. The vibrating element 9 has two vibrating rods 10a, 10b, to each of which a paddle 11a, 11b is integrally formed at the end. In operation, the vibration fork 3 executes vibration movements according to the vibration mode with which it is excited. Each of the two vibrating rods 10a, 10b behaves essentially like a so-called bending vibrator. In the basic vibrating mode, the two vibrating rods 10a, 10b vibrate in antiphase with each other, for example.

Although numerous different embodiments can be used for the drive/receiving unit 6 within the scope of the present invention, the following description relates, without restriction of generality, to electromagnetic drive/receiving units 6 having at least one coil as described in the documents DE102015104533 A1 or DE102016112308A1. Both patent applications are also fully incorporated herein by reference within the framework of the present application.

Figure 2A:
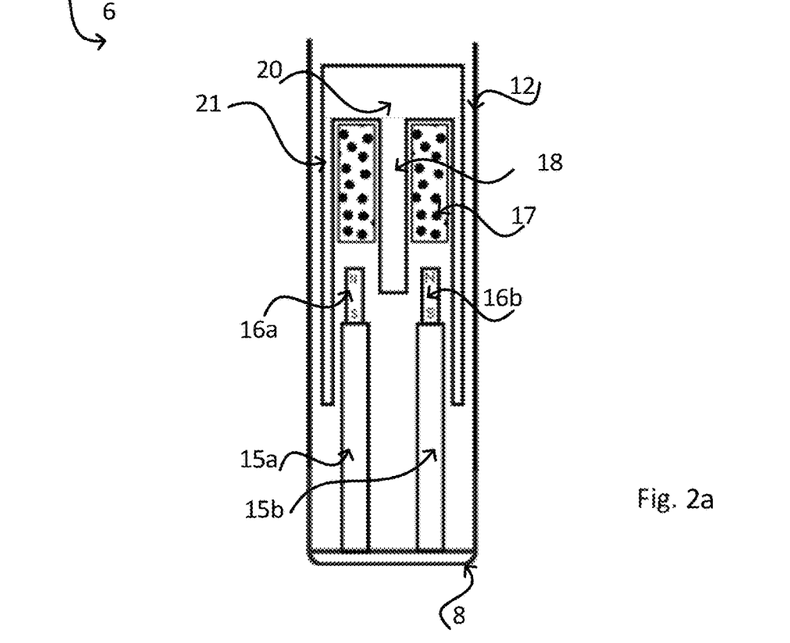
FIGS. 2a and 2b show two embodiments of a vibronic sensor with different electromagnetic drive/receiving units according to the present disclosure.

FIG. 2a shows a schematic view of such a drive/receiving unit 6. A housing 12 terminates with the lower wall with a membrane 8, which is to be associated with the vibratable unit 3. For the embodiment shown here, the housing 12 is cylindrical and the disk-shaped membrane 8 has a circular cross-sectional area A. However, it goes without saying that other geometries are also conceivable and fall under the present invention. Two rods 15a, 15b are fastened to the diaphragm 8 perpendicular to the base surface A of the diaphragm 8 and extend into the interior of the housing 12. This is in particular a non-positive connection. The base surface A of the diaphragm 8 is then in a plane perpendicular to the longitudinal direction of the rods 15a, 15b.

A magnet 16a, 16b, in particular a SmCo or Alnico magnet, is fastened in each case in the end region of the rods 15a, 15b facing away from the membrane 8. The magnets 16a, 16b are preferably all oriented identically. A coil 17 that comprises a wire wound around the core 18 is arranged above the magnets 16a, 16b. The core 18 of the coil 17 is part of a cup-shaped anchor unit 19 having a bottom 20 and a circumferential wall 21. For example, the bottom 20 as well as the base surface A of the diaphragm 8 may have a circular cross-sectional area. From the bottom 20 of the cup-shaped anchor unit 19, the core 18 of the coil 17 extends centrally into the interior of the anchor unit 19 in the form of a connecting piece. In this case, the circumferential wall 21 then has the function of a magnetic field suppression groove. The rods 15a, 15b having the magnets 16a and 16b do not contact the coil 17 and the core 18. In continuous operation, the coil 17 is subjected to an alternating current signal in order to generate an alternating magnetic field. For this purpose, the coil has two connecting wires, not shown in FIG. 2a.

Due to the alternating field, the rods 15a and 15b are deflected horizontally, e.g., perpendicularly or transversely to their longitudinal axis, via the magnets 16a and 16b in such a way that they are set into vibration. On the one hand, the rods 15a and 15b then have a lever effect, by means of which the bending of the rods 15a and 15b generated by the horizontal deflection is transmitted to the membrane 8 in such a way that the membrane 8 is set into vibration. On the other hand, the combination of the two rods 15a and 15b and the membrane 8 is, however, a separate resonator.

Figure 2B:
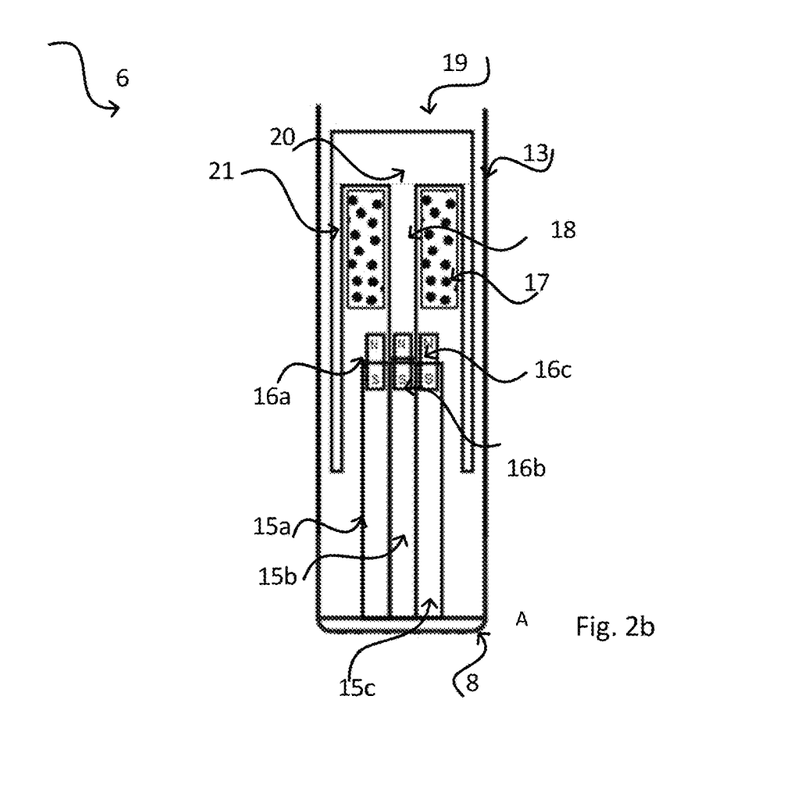

FIG. 2b shows an electromechanical transducer unit 6 similar to FIG. 2a with the difference that in FIG. 2b three rods 15a-15c and three magnets 16a-16c are present, as disclosed in DE 102016112308A1. However, the electromechanical transducer unit can also have four or more rods.

In the case of the embodiments from FIG. 2, the two oscillating rods 10a, 10b of the mechanically vibratable unit 3 and the rods 15a-15c of the transducer unit 6 each form a mechanical resonator with the membrane 8. The membrane 8 is preferably, but not necessarily, embodied in one piece. In particular, it can be assigned to both the vibratable unit 3 and the transducer unit 6.

Figure 3A:
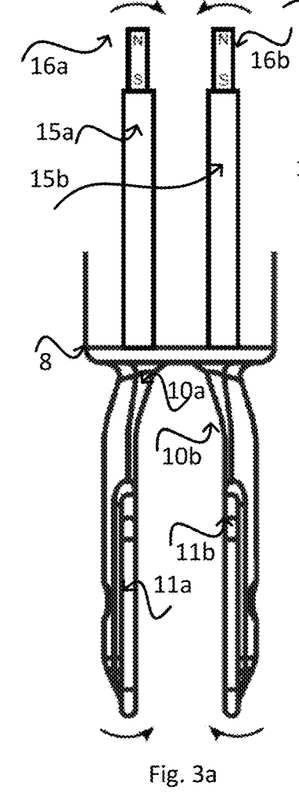
Figure 3B:
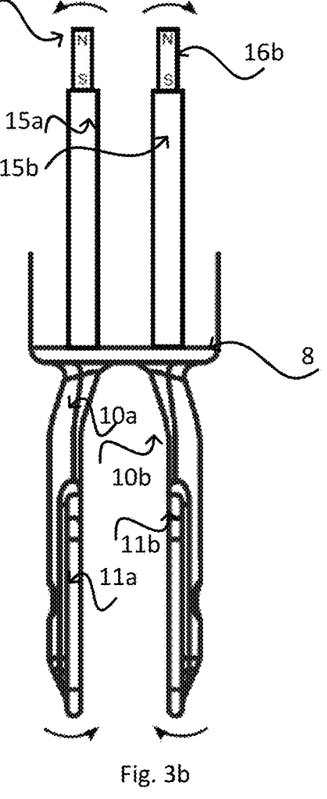

The two resonators are mechanically coupled to one another via the membrane 8, wherein the membrane 8 determines the degree of coupling. In a resonator system coupled in this way, two vibration modes with two different resonant frequencies (F1, F2) occur, which are illustrated in FIG. 3. The two vibration modes are a symmetrical and an antisymmetrical vibration mode. In the symmetrical vibration mode (FIG. 3a), the two resonators comprising the two vibration rods 10a, 10b or the two rods 15a, 15b respectively oscillate mirror-symmetrically with respect to one another, relative to the plane parallel to the base surface A of the membrane 8. Thus, when the rods 15a, 15b move toward one another in the end region facing away from the membrane 8, the two vibrating rods 10a, 10b also move toward one another in the region of the paddles 11a, 11b. In contrast, in the anti-symmetrical vibration mode (FIG. 3b), the rods 15a, 15b move toward one another in the end region facing away from the diaphragm 8 when the two vibrating rods 10a, 10b move away from one another in the region of the paddles 11a, 11b. The anti-symmetrical vibration mode corresponds to the natural vibration movement of a vibration fork 3 of a vibronic sensor. In contrast, in the symmetrical vibration mode, the membrane 8 remains largely unmoved.

Figure 4:
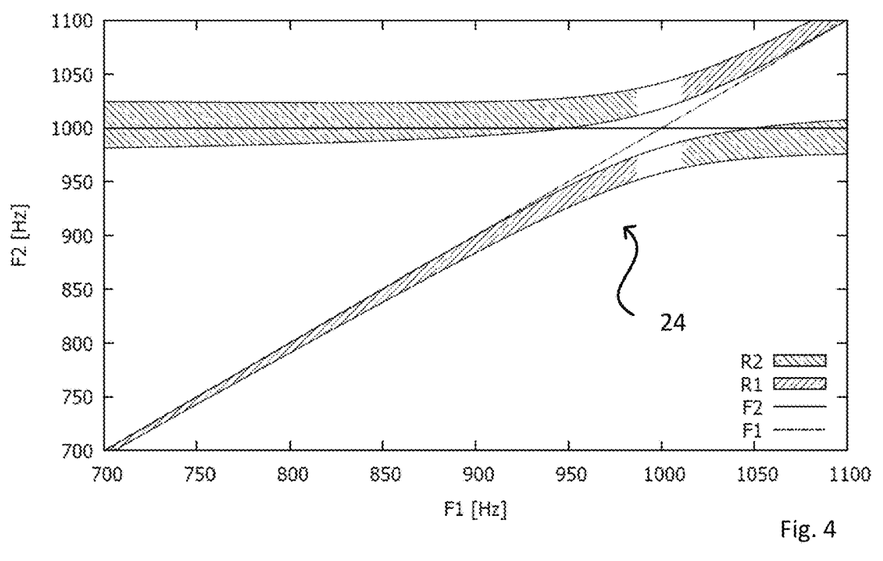
FIG. 4 shows a diagram of the two resonance frequencies of the first and second resonators of FIG. 3.

FIG. 4 shows a diagram in which the frequencies of the two resonators are plotted against each other. F1 denotes the frequency of the first resonator, which comprises the two vibrating rods 10a, 10b, and F2, the frequency of the second resonator, which comprises the two rods 15a, 15b. While the frequency F1 changes when the vibratable unit 3 is immersed in a medium 4, the frequency F2 of the second resonator remains essentially constant. The first frequency F1 is correspondingly dependent on the properties of the medium 4 and can be used to determine the process variable. In contrast, the second frequency F2 corresponding to a second vibration mode has only a negligible dependence on the medium 4. It can advantageously be used to compensate for the influence of the temperature T of the medium 4 on the respective measurement according to an embodiment of the method according to the invention. The two hatchings R1 and R2 result from the coupling between the two resonators, which is mediated by the membrane 8, wherein the width of the hatching indicating the vibration amplitude of the respective resonator.

In the case of a vibronic sensor 1 having a drive/receiving unit 6 as shown in FIG. 2, a medium-dependent and a medium-independent vibration mode are advantageously automatically obtained accordingly, in such a way that the influence of the temperature T can be directly compensated for. However, the present invention is by no means limited to such drive/receiving units 6. Rather, the method according to the invention can be applied to a plurality of differently designed sensors 1. Embodiments with which a medium-independent vibration mode can be directly excited are particularly advantageous.

Figure 5A:
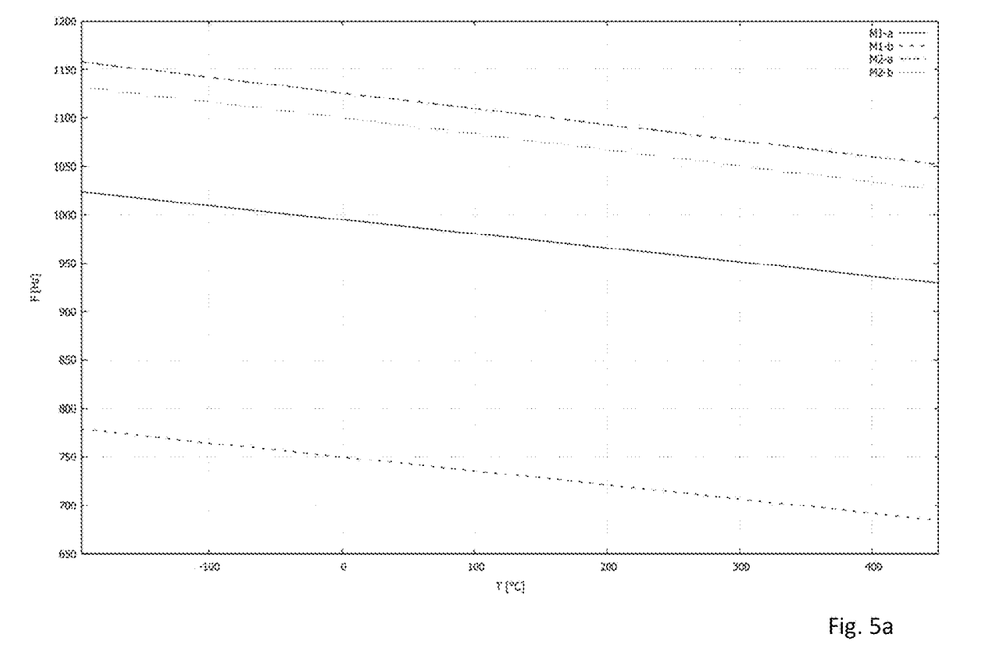
FIGS. 5a and 5b show depictions of the compensation of the influence of the temperature for a vibronic sensor with a driving/receiving unit as shown in FIGS. 3a and 3b.
Figure 5B:
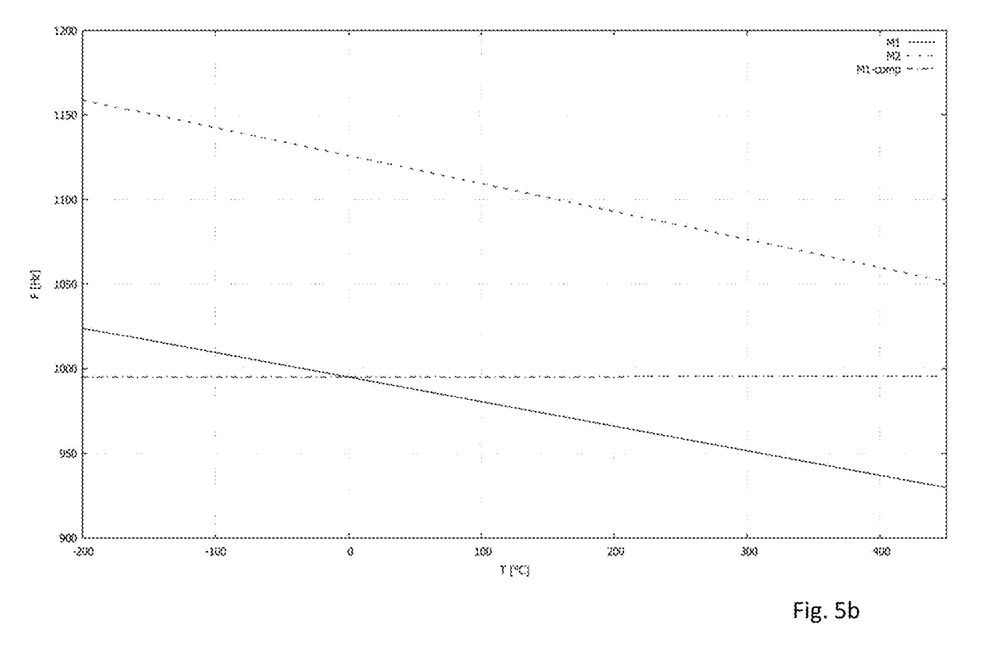

FIG. 5 illustrates a preferred embodiment for compensating for the influence of the temperature T for a vibronic sensor 1 having a first vibration mode M1 and a second vibration mode M2 generated by means of a first A1 and a second excitation signal A2. FIG. 5a shows the frequency f1 and f2 of the first reception signal E1 and the second reception signal E2 as a function of the temperature T for two different media a and b with different densities. The considerations given here apply analogously to different viscosities of the media. The first vibration mode M1 has only a distinct dependence of the frequency f1 on the density $\rho$ of the medium 4, whereas, in the case of the second vibration mode M2, there is a negligible influence by the medium 4. The second reception signal is accordingly approximately independent of the medium. In both cases, a change in the density $\rho$ of the medium 4 that has occurred leads to a change in the frequency f1, f2 of the respective reception signal E1 or E2 at the same temperature.

All four plotted curves also have essentially the same slope. The temperature T can accordingly be compensated for by means of the slope of the frequency f2 of the second reception signal E2. Since the second reception signal E2 is almost independent of the properties of the medium, a change in the second frequency f2 can essentially be attributed to a change in the temperature T of the medium.

FIG. 5b also shows a temperature-compensated first reception signal $E1_{comp}$ of the first vibration mode $M1_{comp}$ in addition to the frequencies f1 and f2 of the two reception signals E2 and E2. On the basis of this signal, the respective process variable can be determined independently of the temperature T of the medium.

In order to be able to compensate for an influence of the medium on the second reception signal E2 with high precision, a reference curve or a reference value can additionally be used; for example, the second reception signal or the frequency of the second reception signal can be determined at a known temperature for different media. However, numerous other embodiments or possibilities for compensating for the temperature for the first reception signal E1 are also conceivable and fall within the present invention.

In summary, the present invention allows for a vibronic sensor 1 to compensate for the influence of the temperature T of the medium 4, without integrating further components for determination. The influence of the temperature can be compensated for during continuous operation in such a way that a temperature-independent and highly accurate determination of the respective process variable is possible. In addition, the temperature of the medium can also be determined. The temperature compensation and/or determination advantageously takes place directly at the location of the medium, so that a very precise and rapid temperature compensation or determination is likewise possible.

The invention claimed is:

1. A method for determining and/or monitoring at least one process variable of a medium using a vibronic sensor, the method comprising:
    exciting a mechanically vibratable unit with a drive/receiving unit to vibrate mechanically in a first vibration mode using an electrical first excitation signal;
    receiving and converting the mechanical vibrations of the vibratable unit in the first vibration mode into an electrical first reception signal, wherein the first excitation signal is generated based on feedback from the first reception signal;

determining the at least one process variable from the first reception signal;

exciting the mechanically vibratable unit with the drive/receiving unit to vibrate mechanically in a second vibration mode using an electrical second excitation signal of the mechanically vibratable unit;

receiving and converting the mechanical vibrations of the vibratable unit in the second vibration mode into an electrical second reception signal, wherein the second excitation signal is generated based on feedback from the second reception signal; and compensating for an influence of a temperature of the medium on the first reception signal using the second reception signal.

2. The method of claim 1, wherein the first excitation signal and the second excitation signal are generated simultaneously such that the mechanical vibrations of the vibratable unit in the first vibration mode and second vibration mode are superimposed on each other.

3. The method of claim 1, wherein the first excitation signal and the second excitation signal are generated alternately.

4. The method of claim 1, wherein the first excitation signal and the second excitation signal are generated sequentially.

5. The method of claim 1, wherein the temperature of the medium is determined based on the second reception signal.

6. The method of claim 1, wherein a frequency of the second reception signal is determined, and wherein the influence of the temperature is determined using a change in the frequency of the second reception signal.

7. The method of claim 6, wherein the second excitation signal and therewith the second vibration mode are selected such that the frequency of the second reception signal is essentially constant as a function of a density and/or a viscosity of the medium.

8. The method of claim 1, wherein a reference curve and/or a reference value for the second reception signal, and/or a variable derived therefrom, is used to compensate for the influence of the temperature.

9. The method of claim 8, further comprising compensating for an influence of a density and/or a viscosity of the medium on the second reception signal based on the reference curve and/or the reference value for the second reception signal, and/or the variable derived therefrom, before the second reception signal is used to compensate for the influence of the temperature.

10. A device for determining and/or monitoring at least one process variable of a medium, the device comprising:

a mechanically vibratable unit;

a drive/receiving unit configured to excite the mechanically vibratable unit using a first excitation signal to vibrate mechanically in a first vibration mode and configured to receive and convert the mechanical vibrations of the vibratable unit in the first vibration mode into a first electrical reception signal; and an electronic unit configured to generate the first excitation signal based on feedback from the first reception signal and to determine the at least one process variable from the first reception signal, wherein the drive/receiving unit is further configured to excite the mechanically vibratable unit using a second excitation signal to vibrate mechanically in a second vibration mode and configured to receive and convert the mechanical vibrations of the vibratable unit in the second vibration mode into a second electrical reception signal, and wherein the electronics unit is further configured to generate the second excitation signal based on feedback from the second reception signal and to compensate for an influence of a temperature of the medium on the first reception signal using the second reception signal.

11. The device of claim 10, wherein the vibratable unit is a membrane, a single rod or a vibration fork.

12. The device of claim 10, wherein the process variable is a fill level, a density and/or a viscosity of the medium.

13. The device of claim 10, wherein the drive/receiving unit comprises at least:

a membrane configured to be displaced into mechanical vibrations;

two rods fixed to the membrane perpendicular to a base surface of the membrane;

a housing, wherein the membrane defines at least a partial area of a wall of the housing, and wherein the two rods extend into an interior of the housing;

two magnets, wherein each magnet is fixed at or near an end of one of the two rods opposite the membrane; and a coil having a core fixed inside the housing adjacent the magnets, wherein coil is configured to be subjected to an electrical alternating current signal and to generate a magnetic field thereby, which magnetic field sets the two rods into mechanical vibrations via the two magnets, and wherein the two rods are fixed to the membrane such that vibrations of the membrane result from the vibrations of the two rods.

14. The device of claim 10, wherein the drive/receiving unit comprises at least:

a membrane adapted to be displaced into mechanical vibrations;

at least three rods fixed to the membrane perpendicular to a base surface of the membrane;

a housing, wherein the membrane defines at least a partial area of a wall of the housing, and wherein the two rods extend into an interior of the housing;

at least three magnets, wherein each magnet is secured to one of each of the at least three rods at or near an end opposite the membrane; and a coil having a core that is fixed in the interior of the housing adjacent the magnets, wherein the coil is adapted to be subjected to an electrical alternating current signal, wherein the coil is configured to generate a magnetic field, which magnetic field causes the rods to vibrate via the magnets, wherein the rods are fixed to the membrane such that vibrations of the membrane result from the vibrations of the rods, and wherein at least one of the rods is fixed to the membrane at a location along the base surface at which a second derivation of a deflection of the membrane from a rest position, as a function of the location on the base surface, is essentially zero.

* * * * *